(12) United States Patent
Pellegrin et al.

(10) Patent No.: US 6,749,191 B2
(45) Date of Patent: Jun. 15, 2004

(54) DRIVE SYSTEM FOR AN ARTICLE CONVEYOR MODULE

(75) Inventors: Laurent Pellegrin, Livron (FR); Jean Rieu, Saint Georges les Bains (FR)

(73) Assignee: Solystic, Gentilly Cedex (FR)

( * ) Notice: Subject to any disclaimer, the term of this patent is extended or adjusted under 35 U.S.C. 154(b) by 0 days.

(21) Appl. No.: 10/265,675

(22) Filed: Oct. 8, 2002

(65) Prior Publication Data

US 2003/0079966 A1 May 1, 2003

(30) Foreign Application Priority Data

Oct. 26, 2001 (FR) .............................. 01 13907

(51) Int. Cl.$^7$ .............................................. B65G 23/04
(52) U.S. Cl. .......................... 271/2; 198/583; 198/833; 198/835; 198/860.2
(58) Field of Search .............................. 271/2; 198/583, 198/781.03, 781.09, 781.1, 790, 833, 835, 860.2

(56) References Cited

U.S. PATENT DOCUMENTS

| | | | | |
|---|---|---|---|---|
| 1,614,816 A | * | 1/1927 | York .......................... 198/790 |
| 5,096,045 A | * | 3/1992 | Feldl .......................... 198/583 |
| 5,609,238 A | * | 3/1997 | Christensen ................. 198/583 |

FOREIGN PATENT DOCUMENTS

| | | |
|---|---|---|
| DE | 2 029 395 A | 12/1971 |
| DE | 199 12 391 A1 | 11/1999 |
| FR | 2 517 649 A | 6/1983 |
| GB | 2 164 311 A | 3/1986 |

\* cited by examiner

*Primary Examiner*—Mark A. Deuble
(74) *Attorney, Agent, or Firm*—Sughrue Mion, PLLC

(57) ABSTRACT

The article conveyor module has a drive system comprising a support plate on which there are mounted a synchronization pulley and a drive belt engaging said synchronization pulley. The synchronization pulley is for coupling to the drive belt of another conveyor module for the purpose of synchronizing the two conveyor modules. In this conveyor module drive system, the synchronization pulley is mounted outside the drive belt. The drive belt of the other conveyor module can also engage the synchronization pulley while remaining on the outside thereof. With this configuration, synchronizing two conveyor modules does not require an intermediate synchronization belt to be installed.

8 Claims, 1 Drawing Sheet

FIG_1
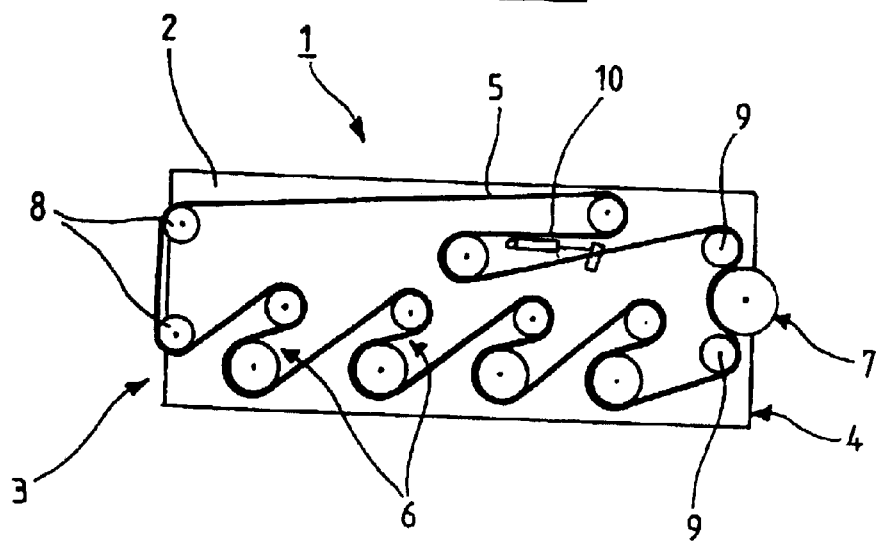
FIG_2
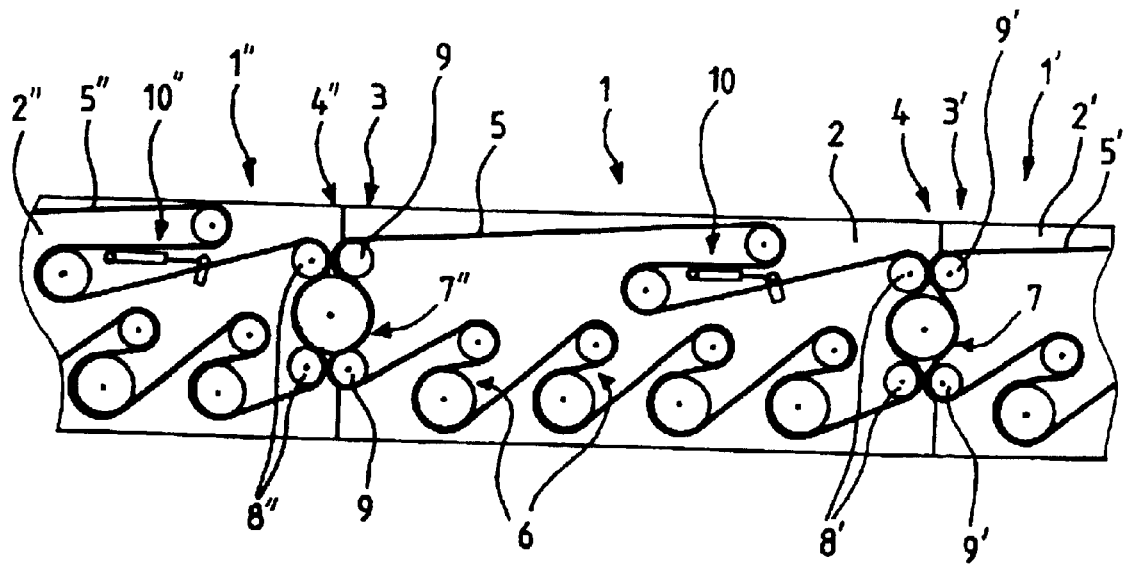

DRIVE SYSTEM FOR AN ARTICLE CONVEYOR MODULE

The invention relates to an article conveyor module having a drive system comprising a support plate having a synchronization pulley mounted thereon and a driving belt engaged in said synchronization pulley, the synchronization pulley being designed to be coupled to the drive belt of another conveyor module in order to synchronize the two conveyor modules.

The invention applies more particularly to a conveyor module using belts or the like in order to convey postal articles such as letters.

BACKGROUND OF THE INVENTION

By way of example, a conveyor belt module for postal articles may comprise wheels on its top portion which drive the conveyor belts by friction, which belts run along the structure of the conveyor over a distance that may amount to several tens of meters. Conveyor modules are placed in alignment along the entire length of the conveyor belts and thus of the structure of the conveyor. The support plate of each conveyor module is generally disposed horizontally flat, with the top face of the support plate corresponding to the top portion of the conveyor module. The drive belt of a conveyor module drive system is mounted on the bottom face of the support plate of the module and is engaged on a set of pulleys (or wheels) mounted on said bottom face of the support plate. These pulleys on the bottom face of the support plate are constrained to rotate with wheels situated on the top portion of the conveyor module via common rotary shafts passing through the support plate. The drive belt of each conveyor module is set into motion by an electric motor forming part of the conveyor module drive system and driving one of the pulleys that has the drive belt engaged thereon. To ensure that the wheels situated on the top proton of the conveyor module are all rotated at the same speed, it is necessary to synchronize the conveyor modules because the various motors of the drive systems can present dispersion in their speeds of rotation. This synchronization is performed by coupling the drive belts of two adjacent conveyor modules together in pairs. At present, a conveyor module drive system has two two-stage synchronization pulleys disposed respectively at each of the two ends of the support plate. These two synchronization pulleys are rotated by the drive belt and they are disposed inside it. The drive belt is engaged on the first stage of each of the two synchronization pulleys. Two adjacent conveyor modules have their drive belts coupled together at present by engaging a synchronization belt on the second stages of two synchronization pulleys belonging respectively to the two adjacent conveyor modules which are placed end to end. This coupling presents the drawback of requiring synchronization belt to be put into place and adjusted on site, which is expensive in terms of time.

OBJECT AND SUMMARY OF THE INVENTION

The object of the invention is to remedy that drawback by proposing an architecture for a conveyor module drive system that enables installation steps on site to be simplified.

For this purpose, the invention provides an article conveyor module having a drive system comprising a support plate having a synchronization pulley mounted thereon and a drive belt engaged in said synchronization pulley, the synchronization pulley being designed to be coupled with the drive belt of another conveyor module to synchronize the two conveyor modules, wherein the synchronization pulley is mounted outside said drive belt.

With this arrangement, the drive belts of two adjacent conveyor modules are coupled together by pressing one of the drive belts against the synchronization pulley of the other conveyor module, and as a result synchronizing two adjacent modules does not require an intermediate synchronization belt to be installed.

More particularly, in a particular embodiment of a conveyor module of the invention, said drive belt has a substantially rectilinear portion running along a first end of the plate and the synchronization pulley is mounted at a second end of the plate for juxtaposing with a first end of the support plate of another conveyor module that is substantially identical.

According to a particular feature of the invention, said first and second ends of the plate of a conveyor module are constituted by two substantially parallel end flanks of the plate, the synchronization pulley projecting from one of the flanks of the plate. With this arrangement, two adjacent conveyor modules can be mounted edge to edge for coupling the two drive belts together.

According to yet another particular feature of the invention, the drive belt of a conveyor module drive system is tensioned by a constant-force dynamic tensioner mounted on the plate, e.g. a gas tensioner. With this arrangement, there is no need to adjust the tension of the drive belts on site after the conveyor modules have been installed.

BRIEF DESCRIPTION OF THE DRAWINGS

The invention is described in greater detail below with reference to the accompanying drawing which shows an embodiment by way of non-limiting example.

FIG. 1 is a diagrammatic view of the bottom face of the plate of a drive system for a conveyor module of the invention.

FIG. 2 is a diagrammatic view of a plurality of adjacent conveyor modules of the invention as seen from beneath.

MORE DETAILED DESCRIPTION

As can be seen in FIG. 1, a conveyor module 1 for articles, e.g. a belt conveyor for postal articles, has a drive system comprising a support plate 2 for mounting on the structure of a conveyor module. The plate defines a substantially plane shape which extends longitudinally between a first end 3 and a second end 4. The drive system of the conveyor module also comprises drive wheels mounted on the top face of the plate which are driven by a drive belt 5 mounted on the bottom face of the plate and extending between its two ends 3 and 4. The drive belt 5 drives the wheels on the top face via a plurality of pulleys 6 mounted on the bottom face, with the belt being engaged around said pulleys. The belt is also engaged with the pulley of an electric motor (not shown). In this embodiment, the drive belt 5 follows a path lying in a plane parallel to the plane of the plate 2 and serves to drive pulleys 6 which rotate about axes that are normal to the plane of the plate 2. The drive system of the conveyor module also comprises a synchronization pulley 7 which is mounted on the bottom face of the plate at the second end 4, and against which the drive pulley 5 is engaged. This synchronization pulley is designed to be coupled with the drive pulley of another conveyor module that is adjacent in order to synchronize one module with the other.

According to the invention, the synchronization pulley lies outside the outline defined by the drive belt 5 so that a portion of the running path of the pulley 7 is free to engage directly with a drive belt of another conveyor module.

As shown in FIG. 2, where there can be seen three juxtaposed conveyor modules 1, 1', and 1" of the invention, the two drive belts 5 and 5' of the modules 1 and 1' are engaged on respective sides of the synchronization pulley 7 of the module 1, with both belts being situated outside the pulley. In analogous manner, the synchronization pulley 7" of the module 1" lies outside the two drive pulleys 5 and 5" of the modules 1 and 1". With such an "opposing" configuration, the two drive belts 5 and 5" engage the pulley 7"—which pulley is a single stage pulley—as soon as the two modules 1 and 1" are juxtaposed one against the other. In the same manner, the two drive belts 5 and 5' of the drive systems of the modules 1 and 1' engage the synchronization pulley 7 as soon as the two modules 1 and 1' are juxtaposed one against the other.

According to a particular feature, the drive belt 5 of the conveyor module 1 has a substantially rectilinear portion running along the first end 3 of the plate 2 so as to be capable of engaging the synchronization pulley 7" of the adjacent module 1" merely by being juxtaposed thereto. In this embodiment, the synchronization pulley 7 is mounted at the second end 4 of the plate 2 of the module 1. With this arrangement, two identical modules 1 and 1" can be coupled merely by juxtaposing the first end 3 of the module 1 and the second end 4" of the module 1". In analogous manner, the first end 3' of the module 1' is juxtaposed with the second end 4 of the module 1 so that the two modules 1 and 1' are synchronized.

More particularly, the path of the drive belt 5 is determined by two first guide pulleys 8 spaced along the first end 3, these guide pulleys 8 also serving to hold the drive belt 5 pressed against the synchronization pulley 7" of the adjacent conveyor module 1". In analogous manner, two second guide pulleys 9 are situated on either side of the synchronization pulley 7 so as to be spaced along the second end 4 in order to hold the drive belt 5 pressed against the pulley 7.

According to a particular feature of the invention, the ends 3 and 4 of the plate 2 of the conveyor module 1 are constituted by two substantially parallel end flanks, and the synchronization pulley 7 is mounted to project from the end flank of the second end 4. In the example shown in FIGS. 1 and 2, each plate 2, 2', 2" is substantially rectangular in outline with the end flanks are constituted by its two short sides. A drive system for the conveyor module 1 can thus be positioned relative to another conveyor module 1' by causing the flanks of the plates of the two modules to press one against another so as to ensure that the synchronization pulley 7 of the module 1 engages both drive belts 5 and 5'. In this manner, installation operations on site are further simplified since it suffices to juxtapose the various conveyor modules on a support structure while ensuring that the flanks of adjacent modules press together in pairs so as to ensure that adjacent modules are synchronized in pairs.

In yet another preferred embodiment of the invention, the drive belt 5 is tensioned by a constant force tensioning member 10. As is known in the state of the art, such a tensioning member can comprise, for example, a pulley mounted on a rocker arm which is urged by a spring or a gas member so as to exert a tensioning force on the drive belt 5. Such a tensioning member can be dimensioned so as to exert a substantially constant force on the drive belt 5. This ensures that the tension in the drive belt 5 does not vary when two conveyor modules are coupled together, i.e. when the first end 3 of a conveyor module 1 is caused to press substantially against the second end 4" of another conveyor module 1". With this particular arrangement, the tension of each drive belt 5 can be set in the workshop and requires no further adjustment during installation of conveyor modules on site. An additional advantage of this arrangement is to ensure that the couplings between the pulley 7 and each of the drive belts 5 and 5' have mechanical characteristics that are substantially identical in terms of transmissible forces.

What is claimed is:

1. An article conveyor module having a drive system comprising a support plate having a synchronization pulley mounted thereon and a drive belt engaged in said synchronization pulley, the synchronization pulley being designed to be coupled with a drive belt of another conveyor module to synchronize the two drive systems, wherein said drive belt of the conveyor module has a substantially rectilinear portion running along a first end of the plate of the module, wherein said synchronization pulley is mounted at a second end of the plate of the module, said second end of the module being designed for juxtaposing with a first end of the support plate of the adjacent other conveyor module that is substantially identical, and wherein the synchronization pulley of the module is mounted outside said drive belt of the drive system of the conveyor module such that synchronization of two conveyor modules is performed by the synchronization pulley of the conveyor module bearing against the drive belt of the adjacent other conveyor module.

2. A conveyor module according to claim 1, in which said first and second ends of the plate of a conveyor module are constituted by two substantially parallel end flanks of the plate, the synchronization pulley projecting from one of the flanks of the plate.

3. A conveyor module according to claim 1, in which the drive belt of a conveyor module is tensioned by a constant force dynamic tensioner mounted on the plate.

4. A conveyor module according to claim 3, in which the dynamic tensioner is a gas tensioner.

5. A conveyor comprising one or more modules according to claim 1 and disposed adjacent to one another in pairs.

6. An article conveyor drive system, comprising:

a first article conveyor module, comprising:

a first support plate having one end A and another end B opposite the end A;

a first synchronization pulley mounted at or near the end B; and a first drive belt engaged with the first synchronization pulley, the first drive belt runs along a path that defines a first outline; and a second article conveyor module, comprising a second support plate having one end A' and another end B' opposite the end A', and a second drive belt; and wherein the first synchronization pulley is disposed outside the first outline defined by the first drive belt, the first synchronization pulley configured to couple with the second drive belt of the second article conveyor module to synchronize the two drive systems.

7. The article conveyor drive system according to claim 6, wherein the second synchronization pulley is mounted at or near the end B', the a second drive belt is engaged with the second synchronization pulley, and the second drive belt runs along a path that defines a second outline such that the second synchronization pulley is disposed outside the second outline defined by the second drive belt.

8. The article conveyor drive system according to claim 7, wherein the second drive belt has a substantially rectilinear portion running along the end A' of the second support plate of the second module; and the second module is juxtaposed with the first module so that the substantially rectilinear portion of the second drive belt bears against the first synchronization pulley outside the first outline, thereby synchronizing the first drive belt with the second drive belt.

* * * * *